United States Patent
Hunter et al.

(10) Patent No.: US 7,688,243 B2
(45) Date of Patent: Mar. 30, 2010

(54) METHOD AND SYSTEM FOR RECEIVING DISTANCE MEASUREMENT EQUIPMENT CHANNELS IN AN UNDERSAMPLED BROADBAND RECEIVER

(75) Inventors: Jeffrey K. Hunter, Olathe, KS (US); Timothy P. Gibson, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/345,908

(22) Filed: Dec. 30, 2008

(65) Prior Publication Data

US 2009/0147898 A1 Jun. 11, 2009

Related U.S. Application Data

(63) Continuation of application No. 11/610,973, filed on Dec. 14, 2006, now Pat. No. 7,498,966.

(51) Int. Cl.
*H03M 1/12* (2006.01)

(52) U.S. Cl. .................. 341/155; 341/157; 713/324

(58) Field of Classification Search ............. 341/155, 341/157; 713/300, 324; 455/137, 139, 140
See application file for complete search history.

(56) References Cited

U.S. PATENT DOCUMENTS 5,781,156 A * 7/1998 Krasner ............. 342/357.12

| | | | |
|---|---|---|---|
| 6,031,869 A | 2/2000 | Priebe et al. | |
| 6,337,885 B1 | 1/2002 | Hellberg | |
| 7,171,175 B2 * | 1/2007 | Lahti et al. .......... | 455/135 |
| 2006/0227898 A1 | 10/2006 | Gibson et al. | |

FOREIGN PATENT DOCUMENTS

| GB | 2062395 | 5/1981 |
|---|---|---|
| GB | 2349783 | 11/2000 |

OTHER PUBLICATIONS

Bostamam, A M et al., "Experimental Investigation of Undersampling for Adjacent Channel Interference Cancellation Scheme", Personal, Indoor and Mobile Radio Communications, Sep. 11-14, 2005, Publisher: IEEE 16th International Symposium on Berlin, Germany, Published in: Piscataway, NJ.

* cited by examiner

*Primary Examiner*—Brian Young
(74) *Attorney, Agent, or Firm*—Fogg & Powers LLC

(57) ABSTRACT

A method to receive channels in an undersampled broadband receiver is provided. The method includes converting received radio frequency signals to downshifted-sampled-digital signals at an analog-to-digital converter in a sampling system, outputting the downshifted-sampled-digital signals to a digital system for digital processing, and determining if the unique identifying code associated with a desired channel is detectable. Each channel in the radio frequency signal has an assigned unique identifying code. When the unique identifying code is detectable, the method includes detecting the unique identifying code associated with the desired channel. When the unique identifying code is undetectable, the method includes outputting control signals from the digital system to tune an adjustable sample clock in the sampling system and tuning the adjustable sample clock based on the output control signals.

14 Claims, 8 Drawing Sheets

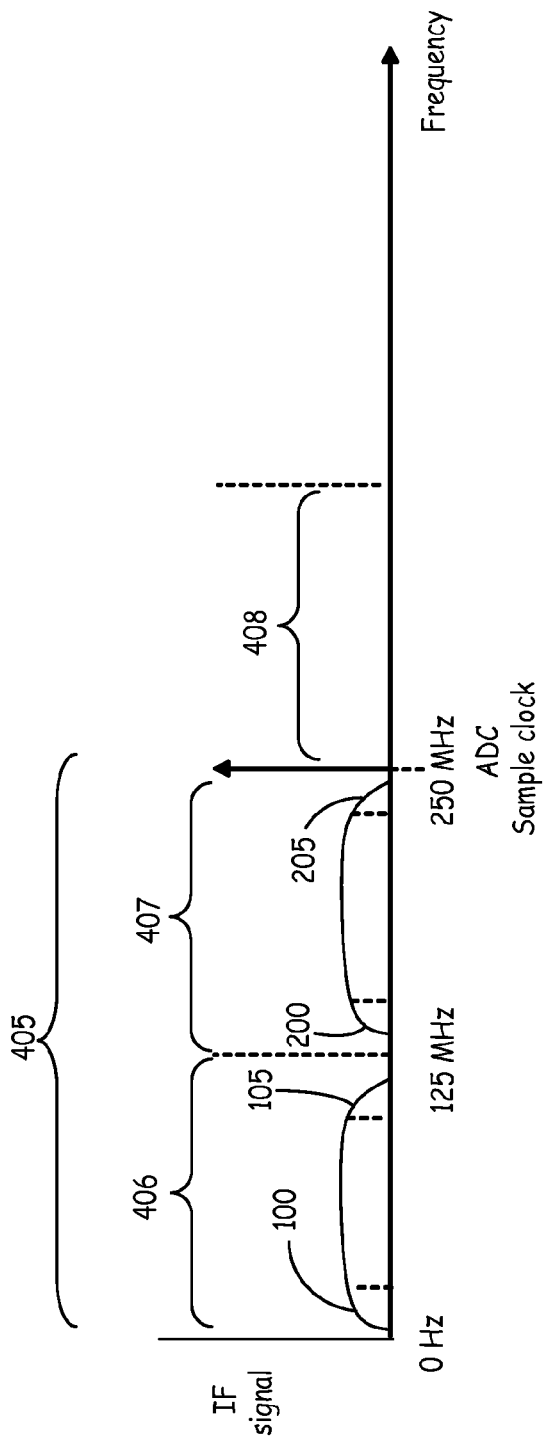
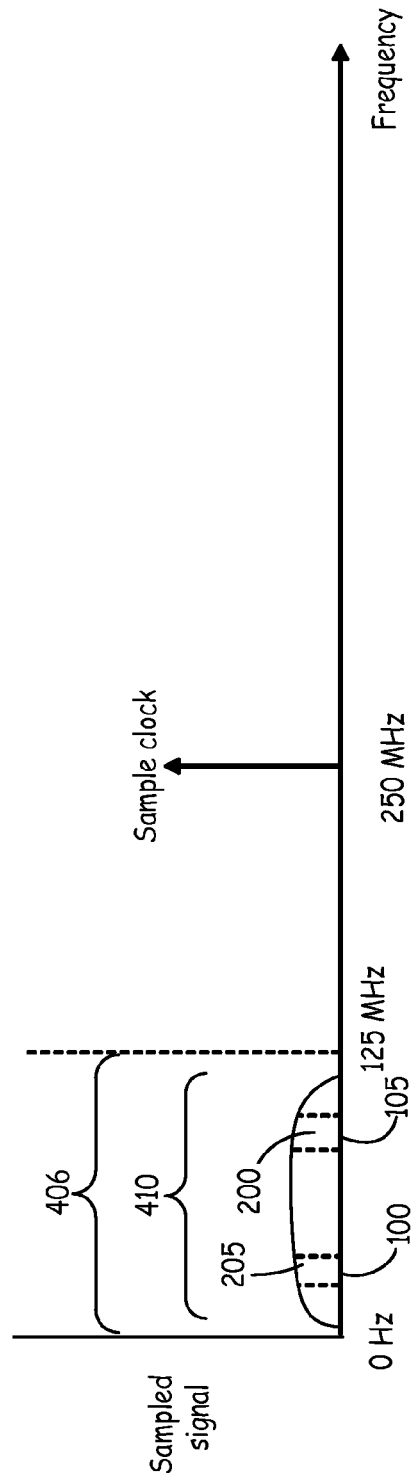

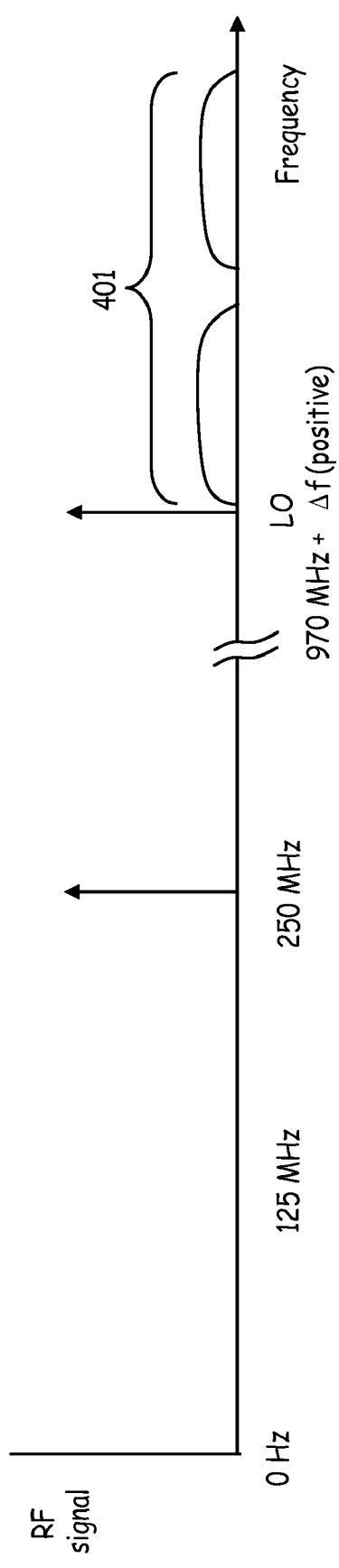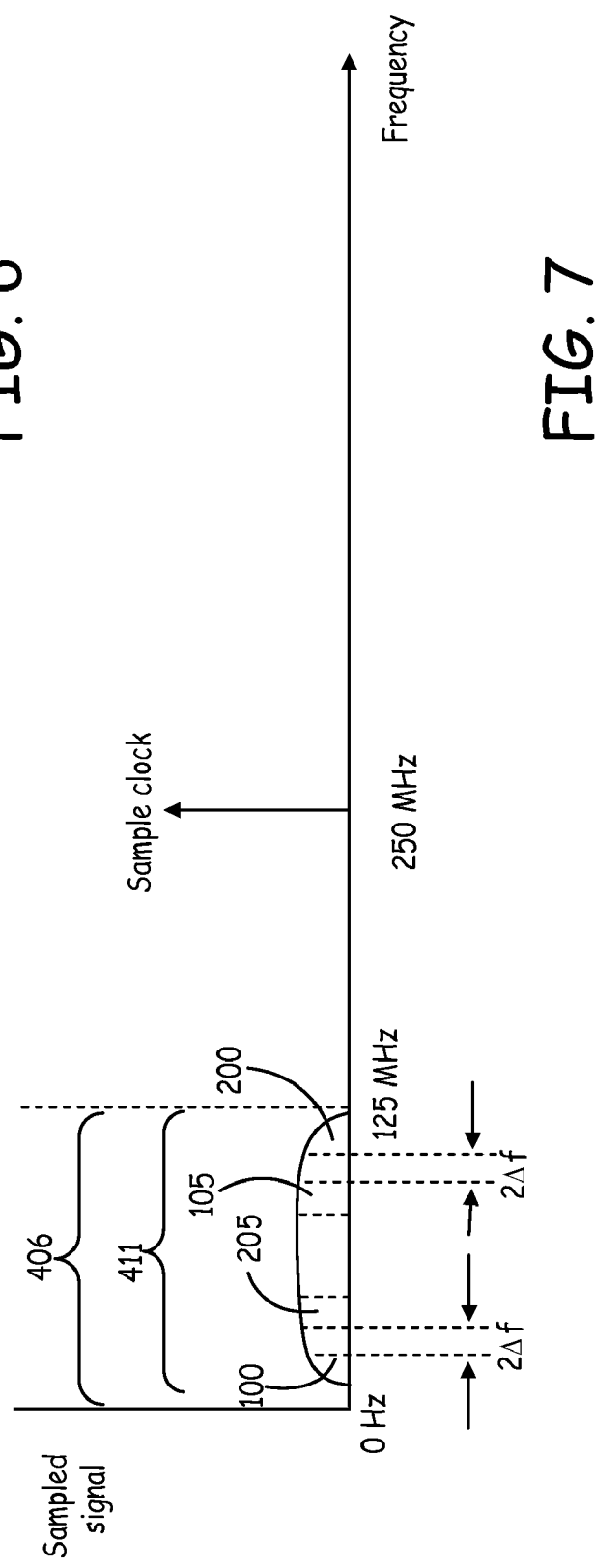
FIG. 6
FIG. 7

METHOD AND SYSTEM FOR RECEIVING DISTANCE MEASUREMENT EQUIPMENT CHANNELS IN AN UNDERSAMPLED BROADBAND RECEIVER

This application is a continuation of U.S. patent application Ser. No. 11/610,973, (pending) filed on Dec. 14, 2006, and entitled "METHOD AND SYSTEM FOR RECEIVING DISTANCE MEASUREMENT EQUIPMENT CHANNELS IN AN UNDERSAMPLED BROADBAND RECEIVER" (the '973 Application). The '973 Application is incorporated herein by reference.

BACKGROUND

Distance measurement equipment is a navigation technology that provides information about the distance between an airborne vehicle and a control tower at an airport. Typically distance measurement equipment is used by a pilot while landing the airborne vehicle. The distance measurement equipment in the airborne vehicle determines propagation delay of ultra-high frequency (UHF) radio signals in order to provide the distance information.

The analog-to-digital converters currently available for use in the distance measurement equipment have limited sample rates. The effective number of bits of resolution of the current analog-to-digital converters is also limited. These limitations have a deleterious impact on the performance of distance measurement equipment (DME), which needs to capture and detect signals in a wide frequency bandwidth. When the analog-to-digital converter in the distance measurement equipment system has enough bits of resolution, the analog-to-digital converter sample rate is too low to capture the entire range of DME channels without some DME channels aliasing onto other channels after the sampling process. Likewise, analog mixer images can be aliased as undesired signals on the desired channel. If aliasing occurs, undesired signal falls on a desired channel and reception on the desired channel is degraded. To overcome aliasing effects, complex RF filters are required.

SUMMARY

The present application relates to a method to receive channels in an undersampled broadband receiver. The method includes converting received radio frequency signals to downshifted-sampled-digital signals at an analog-to-digital converter in a sampling system, outputting the downshifted-sampled-digital signals to a digital system for digital processing, and determining if the unique identifying code associated with a desired channel is detectable. Each channel in the radio frequency signal has an assigned unique identifying code. When the unique identifying code is detectable, the method includes detecting the unique identifying code associated with the desired channel. When the unique identifying code is undetectable, the method includes outputting control signals from the digital system to tune an adjustable sample clock in the sampling system and tuning the adjustable sample clock based on the output control signals.

DRAWINGS

FIGS. 2 and 2i show one embodiment of the frequency distribution of broadband distance measurement equipment channels emitted from the ground based transponder as pulse-pair radio frequency signals.

FIG. 4 shows one embodiment of the frequency distribution of downshifted distance measurement equipment channels.

FIG. 5 shows one embodiment of the frequency distribution of downshifted and undersampled distance measurement equipment channels.

FIG. 6 shows one embodiment of the frequency distribution of distance measurement equipment channels emitted from the ground based transponder and a tuned local oscillator at a frequency less than the lowest frequency of the distance measurement equipment channels.

FIG. 7 shows one embodiment of the frequency distribution of distance measurement equipment channels that were undersampled after being downshifted by the tunable local oscillator.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
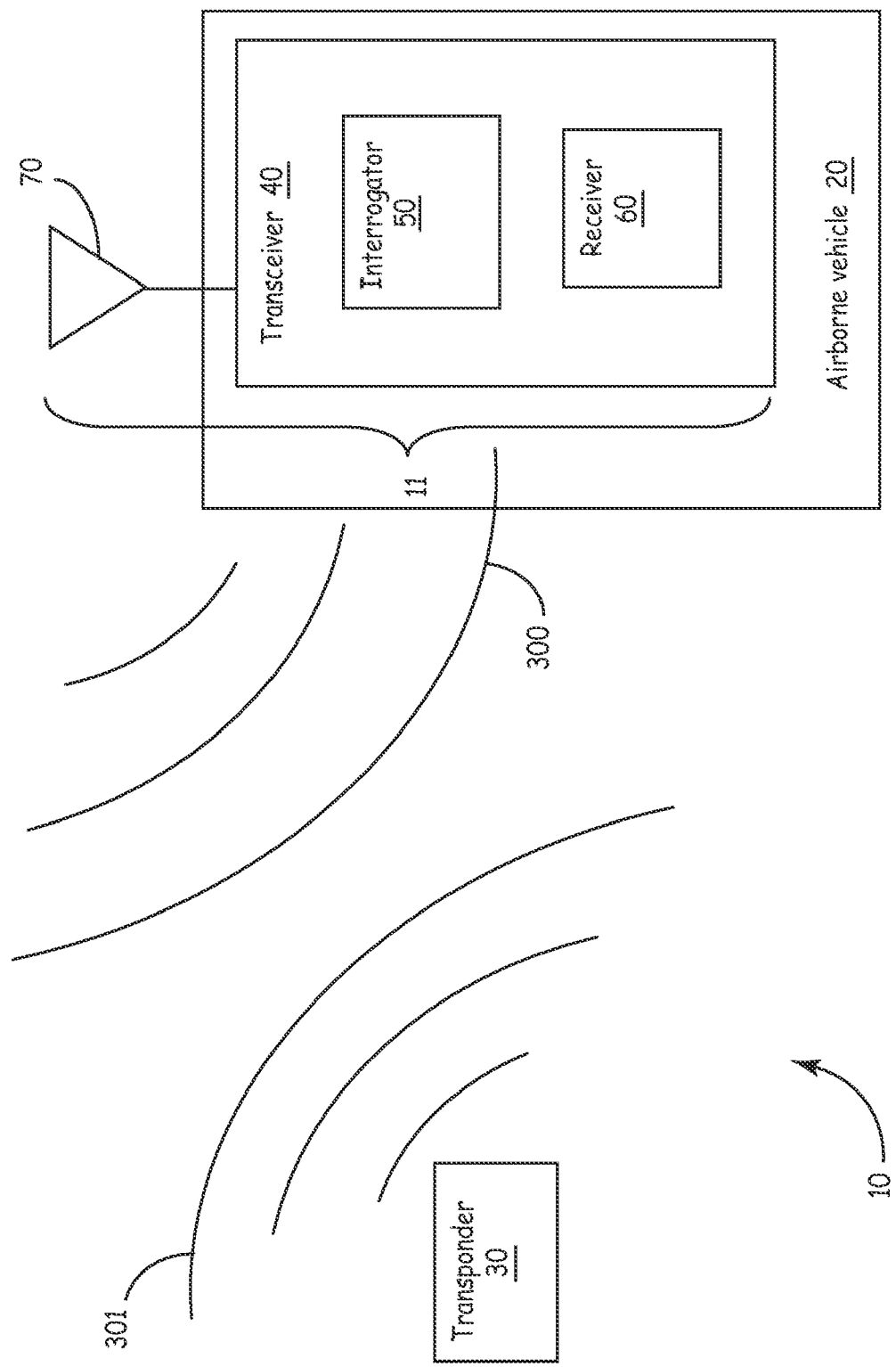
FIG. 1 is a block diagram of one embodiment of a system to remove aliasing effects of undersampled radio frequency signals in an analog-to-digital conversion.

FIG. 1 is a block diagram of one embodiment of an apparatus 11 to remove aliasing effects of undersampled radio frequency signals in an analog-to-digital conversion. The apparatus 11 transmits signals over a wide bandwidth range and under-samples signals received from the transponder 30 within that wide bandwidth range when distance measurement equipment is being operated. Apparatus 11 detects unique identifying codes in the received signals if the received undersampled signals are not in overlapping channels. If the unique identifying code is not detected (due to overlapping aliased active channels) a frequency of a local oscillator within the receiver of the apparatus 11 is offset by Δf. The unique identifying code is then detectable since the previously overlapping aliased are now offset by an amount proportional to the frequency offset Δf.

The distance measuring equipment system 10 includes apparatus 11 in an airborne vehicle 20 and a transponder 30. Each transponder 30 is assigned a unique identifying code. Typically, the transponder 30 is located in a control tower at or near a landing site for the airborne vehicle 20.

The apparatus 11 includes a transceiver 40 communicatively coupled to the transponder 30 via an antenna 70. The transceiver 40 includes an interrogator 50 (also referred to as a "DME interrogator 50") and a receiver 60. The transceiver 40 receives radio frequency signals having a unique identifying code associated with the transponder 30.

As is known in the art, VHF Omni-directional Radio Range (VOR), is a type of radio navigation system for airborne vehicles 20. VORs broadcast a VHF radio composite signal including the control tower's Morse-code identifier and data that allows the airborne vehicle 60 to derive the magnetic bearing from the control tower to the airborne vehicle 20. The transponder 30 also identifies itself with a 1350 Hz morse code three letter identity. If the transponder 30 is collocated with a VOR it will have the same identity code as the VOR. The transponder identity is communicated at a frquency of 1350 Hz to differentiate itself from the 1020 Hz tone of the VOR.

DME frequencies of the transponder 30 are paired to VHF omnidirectional range (VOR) frequencies at the control tower. The DME interrogator 50 automatically tunes to the corresponding frequency when the VOR associated with a transponder 30 is selected. An airborne vehicle's DME interrogator 50 transmits over a wide frequency range (from about 1025 MHz to about 1150 MHz). The transponder 30 communicates on a wide frequency band that is divided into 126 channels for receiving interrogation and 126 channels for transponder replies (from about 970 MHz to about 1213 MHz, as described below with reference to FIGS. 2 and 2i). The interrogation and reply frequencies always differ by 63 MHz. The spacing of all channels is 1 MHz with a signal spectrum width of 100 kHz. References to X and Y channels, as used herein, indicate the spacing of the individual pulses in the DME pulse pair, 12 microsecond spacing for X channels and 36 microsecond spacing for Y channels.

The distance between the airborne vehicle 20 and the transponder 30 is determined by sending and receiving pulse-pair signals, which are two pulses of fixed duration and separation in time. As shown in FIG. 1, the transceiver 40 in the airborne vehicle 20 interrogates the ground based transponder 30. The interrogator 50 in the airborne vehicle 20 emits a series of pulse-pair signals represented generally by the numeral 300 in the wide range of radio frequencies. The transponder 30 in distance measuring equipment system 10 receives the emitted signals and, after a precise time delay, transmits radio frequency signals represented generally by the numeral 301 having the unique identifying code associated with the transponder 30. Specifically, the ground based transponder 30 replies with a series of pulse-pair signals in one channel that are specified by its X or Y channel assignment.

In one implementation of this embodiment, the radio frequency signals 301 include an identifying X Y channel spacing that is unique to the transponder 30. In another implementation of distance measurement equipment system 10, the ground based transponder 30 periodically transmits an assigned Morse code identifier that is unique to the transponder 30. For example, during non-Morse code operations, the transponder 30 generates pulse pairs at a rate of 2700 pulse pairs per second. The DME stations produce the Morse code identifier periodically and not in response to an airborne vehicle 20. The DME station broadcasts a fixed 1350 Hz train of pulse pairs for the dots (0.1 second duration) and the dashes (0.3 second duration). Between the dots and dashes no pulses are sent. The unique identifying code is not limited to X Y channel spacing and Morse code, since other ways to identify a transponder 30 are possible as is known in the art, and other ways to identify a transponder 30 may be developed in the future.

In another implementation of this embodiment, transponder 30 is part of an air traffic control radar beacon system (ATCRBS) that operates at a frequency range from about 1030 MHz to about 1090 MHz. One of skill in the art, after reading this specification, would understand that aspects of the ATCRBS system can be adapted to allow for detection of undersampled signals supported by ATCRBS. Specifically, formats of the signals supported by ATCRBS allow detection of the unwanted interfering aliases.

In yet another implementation of this embodiment, the transponder 30 is part of a universal access transceiver, automatic dependent surveillance-broadcasting (UAT ADS-B) system operating on a plurality of frequencies in a range from about 970 MHz to about 1213 MHz, as described below with reference to FIGS. 2 and 2i. One of skill in the art, after reading this specification, would understand that aspects of the UAT ADS-B system can be adapted to allow for detection of undersampled signals supported by UAT ADS-B system. Specifically, formats of the signals supported by UAT ADS-B system allow detection of the unwanted interfering aliases.

Throughout the approach and landing of the airborne vehicle 20, the distance measurement equipment sends the pulse-pair signals 300 and receives the radio frequency signals 301 in order to continuously monitor the distance of the airborne vehicle 20 from the transponder 30.

Figure 2:
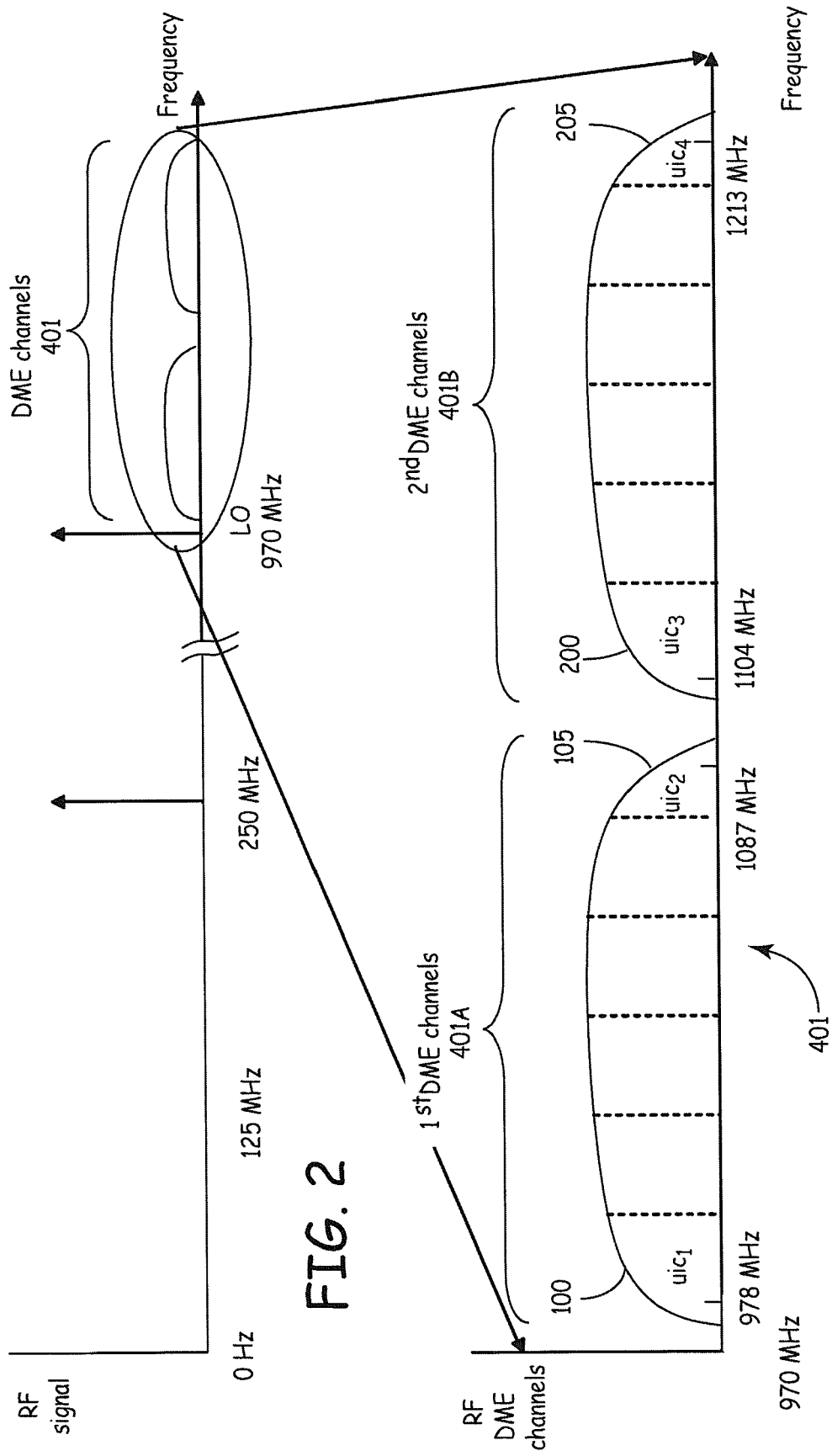

FIGS. 2 and 2i show one embodiment of the frequency distribution of broadband distance measurement equipment channels 401 emitted from the ground based transponder 30 as pulse-pair radio frequency signals 301. The pulse-pair radio frequency signals 301 emitted from the transponder 30 within the broadband distance measurement equipment channels 401 are received at the receiver 60 as pulse-pair signals or pulse-pair signals embedded with Morse code. The broadband distance measurement equipment channels 401, also referred to as DME channels 401, have frequencies greater than the frequency of an exemplary local oscillator (LO) indicated by a vertical arrow at 970 MHz. An exemplary sample clock frequency is indicated by an arrow at 250 MHz.

In the implementation of this embodiment shown in FIG. 2i, the entire band of the DME channels 401 extends from about 978 MHz to about 1213 MHz. In another implementation of this embodiment, the entire band of the DME channels 401 extends beyond 978 MHz to 1213 MHz and apparatus 11 is used to remove aliasing effects of undersampled radio frequency signals.

First DME channels 401A comprise a first channel 100 that includes the shortest exemplary frequency 978 MHz of the first DME channels 401A. The first DME channels 401A comprise a second channel 105 that includes the highest frequency 1087 MHz of the first DME channels 401A. Other channels are positioned between the first channel 100 and the second channel 105.

Second DME channels 401B comprise a third channel 200 that includes the shortest exemplary frequency 1104 MHz of the second DME channels 401B. The second DME channels 401B comprise a fourth channel 205 that includes the highest frequency 1213 MHz of the second DME channels 401B. Other channels are positioned between the third channel 200 and the fourth channel 205.

Each of the channels in the DME channels 401 has a unique identifying code. For example, the first channel 100 has a unique identifying code uic$_1$, the second channel 105 has a unique identifying code uic$_2$, the third channel 200 has a unique identifying code uic$_3$, and the fourth channel 205 has a unique identifying code uic$_4$.

One of unique identifying codes in the DME channels 401 is associated with the unique identifying code assigned to the transponder 30. When an airborne vehicle 20 is preparing to land, the interrogator 50 (FIG. 1) in an airborne vehicle 20 emits pulse-pair signals 300 to interrogate the transponder 30 which has a unique identifying code. The transponder 30 in distance measuring equipment system 10 receives the emitted pulse-pair signals 300 and transmits the radio frequency signals 301 having the unique identifying code associated with the transponder 30. The receiver 60 processes the response to detect the unique identifying code assigned to the transponder 30. Once the unique identifying code for the transponder 30 is detected, the receiver 60 locks on the channel associated with the unique identifying code and determines the distance between the airborne vehicle 20 and the transponder 30 during the landing. In one implementation of this embodiment, the unique identifying code for the transponder 30 is known at the apparatus 11 (FIG. 1).

In one implementation of this embodiment, the assigned channel for the transponder 30 is one of the channels in the DME channels 401. In one such an embodiment, the unique identifying code is an X Y channel spacing. In another such embodiment, the unique identifying code is an assigned Morse code.

Figure 3:
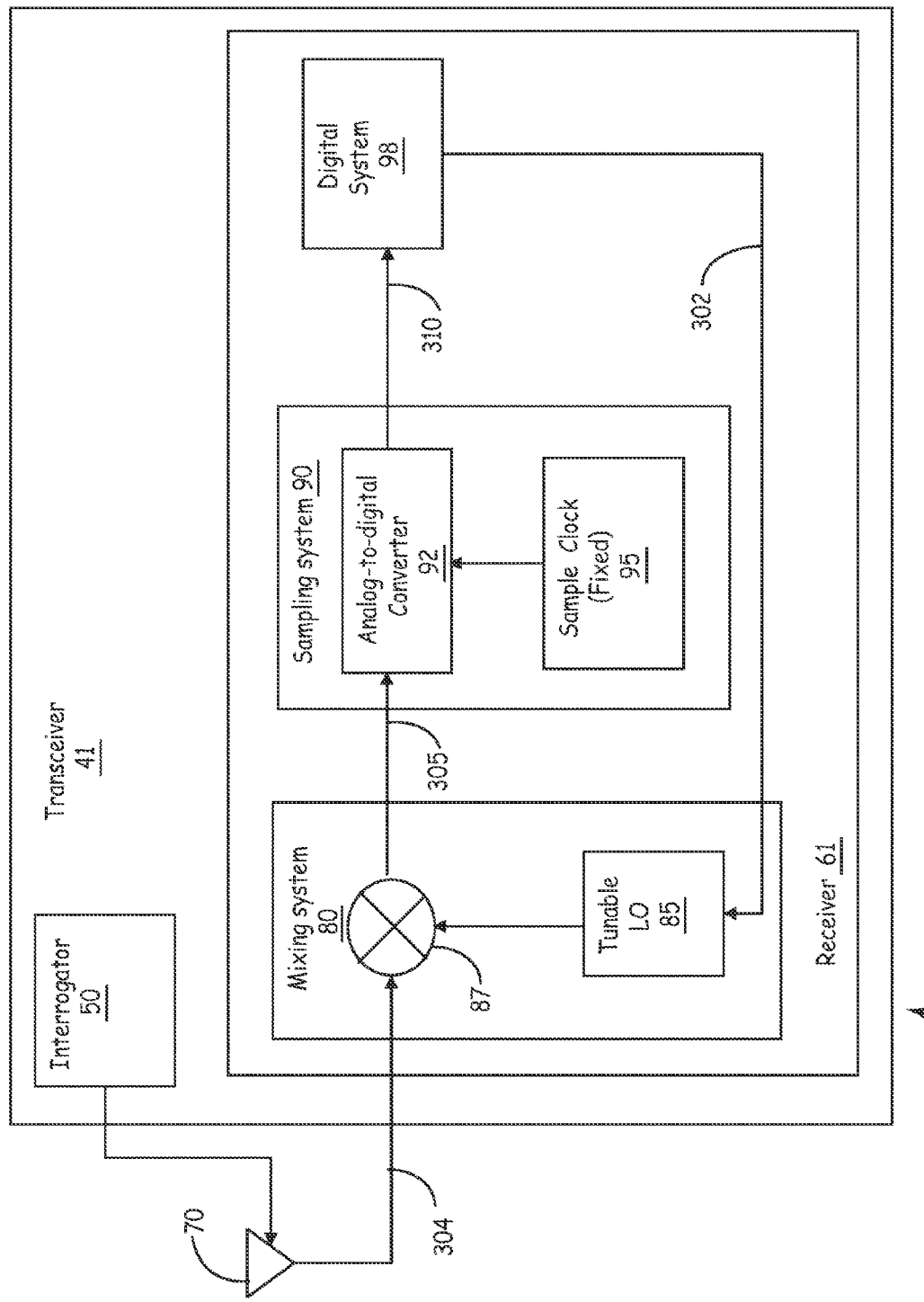
FIG. 3 is a block diagram of one embodiment of a system to remove aliasing effects of undersampled radio frequency signals.

FIG. 3 is a block diagram of one embodiment of an apparatus 12 to remove aliasing effects of undersampled radio frequency signals. In one implementation of this embodiment, apparatus 12 replaces apparatus 11 in the distance measurement equipment system 10 shown in FIG. 1. Apparatus 12 includes the antenna 70 communicatively coupled to a transceiver 41. The transceiver 41 includes the interrogator 50 and a receiver 61. The receiver 61 include includes a mixing system 80, a sampling system 90, and a digital system 98. The mixing system 80 includes a mixer 87 and a tunable local oscillator (LO) 85. The sampling system 90 includes an analog-to-digital converter 92 and a sample clock 95. The sample clock 95 is set at a fixed frequency.

The antenna 70 emits the pulse-pair signals 300 (FIG. 1) and receives the radio frequency signals 301 (FIG. 1). The antenna 70 sends the received radio frequency signals via the connection 304 to the mixer 87 in the mixing system 80.

The mixing system 80 generates intermediate frequency signals from the received radio frequency signals. Specifically, the mixer 87 mixes the radio frequency signals received from the antenna 70 with the single frequency signal fed to the mixer 87 from the tunable local oscillator 85 to generate the intermediate frequency signals. The tunable local oscillator 85 receives control signals that are sent from the digital system 98 via connection 302. The control signals are used to tune the local oscillator 85 from the digital system 98.

The mixing system 80 sends the intermediate frequency signals via connection 305 to the sampling system 90. The analog-to-digital converter 92 in the sampling system 90 receives the intermediate frequency signal from the mixing system 80 and converts received intermediate frequency signal to sampled digital signals. The fixed sample clock 95 outputs a fixed single frequency signal to the communicatively coupled analog-to-digital converter 92. The sampled digital signals are output from the analog-to-digital converter 92 in the sampling system 90 via connection 310 to the digital system 98 for digital processing.

The digital system 98 determines if the unique identifying code associated with the transponder 30 (FIG. 1) is detected. If the unique identifying code is un-detected, the digital system 98 outputs control signals to tune the tunable local oscillator 85. If the unique identifying code is detected, the tunable local oscillator 85 continues to feed the same frequency to the mixer 87.

FIG. 4 shows one embodiment of the frequency distribution of downshifted DME channels 405. The signals within the DME channels 401 (FIGS. 2 and 2i) received at the receiver 60 are downshifted by the mixing system 80 (FIG. 3) to generate the downshifted-DME channels 405, also referred to here as downshifted channels 405. The frequency distribution of the downshifted-DME channels 405 comprises the first Nyquist band 406 and the second Nyquist band 407. In this exemplary embodiment, the fixed single frequency signal output from the fixed sample clock 95 is positioned between the second Nyquist band 407 and the third Nyquist band 408 at 250 MHz.

The DME channels 401 are each downshifted in a manner in which the relative positions of all channels within the DME channels 401 are maintained. For example, first channel 100 is at the shortest frequency, the second channel 105 is between the first channel 100 and the third channel 200. The fourth channel 205 is at the highest frequency. The relative positions of the other channels that are positioned between the first channel 100 and the fourth channel 205 are also maintained. The first channel 100 and the second channel 105 are at the extreme ends of the first Nyquist band 406. The third channel 200 and the fourth channel 205 are at the extreme ends of the second Nyquist band 407.

FIG. 5 shows one embodiment of the frequency distribution of downshifted and undersampled DME channels 401. The downshifted-DME channels 405 are undersampled by the sampling system 90 (FIG. 3) and the sampled-downshifted-DME channels 410 are distributed within the frequency range of the first Nyquist band 406 (FIG. 4).

The downshifted-DME channels 405 are each undersampled in a manner in which the relative positions of the DME channels 401 are not maintained. For example, first channel 100 and the fourth channel 205 overlap each other at the shortest frequency in the first Nyquist band 406. The second channel 105 and the third channel 200 also overlap at the highest frequency in the first Nyquist band 406. Likewise, the other channels that are positioned between the first channel 100 and the second channel 105 also overlap the respective other channels that are positioned between the third channel 200 and the fourth channel 205. Thus, the first channel 100 and the fourth channel 205 are at the low frequency end of the first Nyquist band 406 in one channel of the sampled-downshifted-DME channel 410. Likewise, the second channel 105 and the third channel 200 are at the high frequency end of the first Nyquist band 406 in another channel of the sampled-downshifted-DME channel 410.

In the event that there are signals in two overlapping channels, i.e., the overlapping channels are active, the signals received at frequencies within the overlapping channels are not detectable. The receiver 61 is not able to detect the unique identifying code in either of the overlapping channels. For example, if there are two or more transponders sending signals within the detection range of the transceiver 41, signals in two channels may overlap due to aliasing. In this case, the signals from the two transponders are undetectable by the transceiver 41. Likewise, if the analog mixer 87 generates undesired signals, they can be aliased onto the desired channel, so the desired channel is undetectable.

In order to detect the unique identifying code for the transponder 30, the apparatus 12 offsets the overlying, interfering channels at the receiver 61. FIG. 6 shows one embodiment of the frequency distribution of distance measurement equipment channels emitted from the interrogator and a tuned local oscillator at a frequency less than the lowest frequency of the distance measurement equipment channels. FIG. 6 is similar to FIG. 2, except that the tunable local oscillator 85 in FIG. 6 is offset in frequency from the tunable local oscillator 85 in FIG. 2 by Δf. The shift Δf can adjust the tunable local oscillator 85 in FIG. 6 to a frequency higher than or lower than the frequency of the tunable local oscillator 85 in FIG. 2. For the purposes of this discussion of an exemplary case, the shift Δf is positive and the tunable local oscillator 85 in FIG. 6 is adjusted to a frequency higher than the frequency of the tunable local oscillator 85 in FIG. 2.

FIG. 7 shows one embodiment of the frequency distribution of DME channels 401 that were undersampled after being downshifted by the tunable local oscillator 85. FIG. 7 is similar to FIG. 5, except the signals received at the receiver 61 within channels of the broadband DME channels 401 are downshifted by the mixing system 80 (FIG. 3) after the tunable local oscillator 85 is adjusted by Δf and before the signal is undersampled by the sampling system 90. The sampled-downshifted-DME channels 411 are distributed within the frequency range of about the first Nyquist band 406 of the analog-to-digital converter sample clock. In this exemplary embodiment, the ADC sample clock is set at 250 MHz and the first Nyquist band 406 extends from 0 Hz to 125 MHz.

Since the tunable local oscillator 85 has been adjusted by Δf, the first channel 100 and the fourth channel 205 are offset from each by 2Δf near the lower frequency range of the first Nyquist band 406. The second channel 105 and the third channel 200 also offset from each by 2Δf near highest frequency range in the first Nyquist band 406. Likewise, the other channels that are positioned between the first channel 100 and the second channel 105 are offset from respective other channel that are positioned between the third channel 200 and the fourth channel 205. Thus, the first channel 100 and the fourth channel 205 at the low frequency end of the first Nyquist band do not interfere with each other and the second channel 105 and the third channel 200 at the high frequency end of the first Nyquist band 406 do not interfere with each other. When the tunable local oscillator 85 is tuned by Δf, the receiver 61 is able to detect the unique identifying code in the previously overlapping channels.

In this manner, bands of assigned channels, such as DME channels 401 (FIG. 2), are mixed to generate downconverted bands, such as downshifted DME channels 405 (FIG. 4); the downconverted bands are undersampled to generate sampled-downconverted band, such as sampled-downshifted-DME channels 410 (FIG. 5); the unique identifying code is detected when there are no overlapping active channels; and the unique identifying code is not detected when there are overlapping active channels. When the unique identifying code is not detected the mixing of the assigned channels is tuned by shifting the frequency of the signal output from the tunable local oscillator 85. The bands of assigned channels are remixed to generate tuned-downconverted bands, and the tuned-downconverted bands are undersampled to generate tuned-downconverted bands, such as sampled-downshifted-DME channels 411. Then the unique identifying code is detectable.

Figure 8:
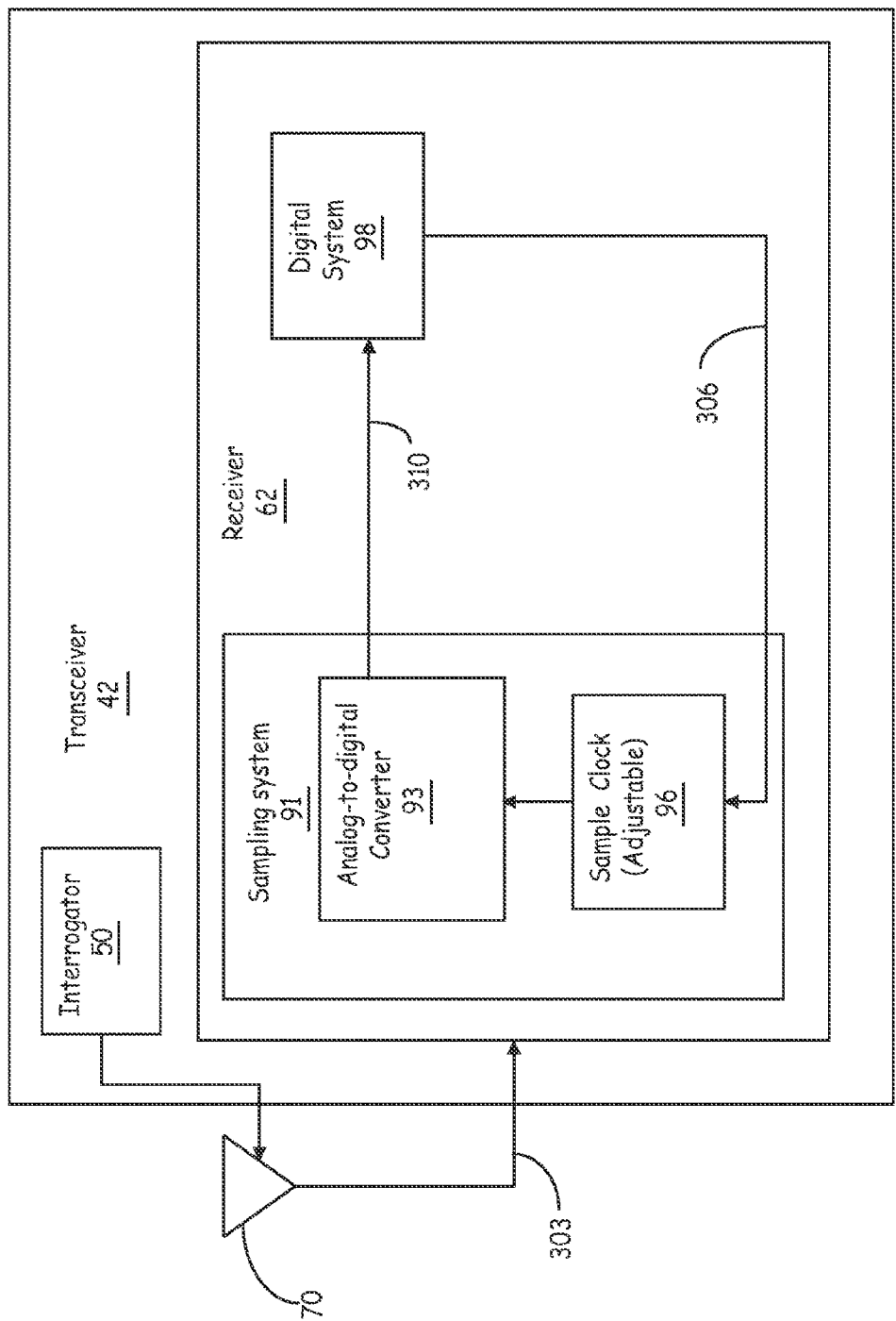
FIG. 8 is a block diagram of one embodiment of an apparatus to remove aliasing effects of undersampled radio frequency signals.

It is also possible to tune the receiver by adjusting the frequency of the signal output from the sample clock that feeds the analog-digital converter when the unique identifying code is not detected. Such an apparatus is shown in FIG. 8. FIG. 8 is a block diagram of one embodiment of an apparatus 13 to remove aliasing effects of undersampled radio frequency signals. In one implementation of this embodiment, apparatus 13 replaces apparatus 11 in the distance measurement equipment system 10 shown in FIG. 1.

Apparatus 13 includes the antenna 70 communicatively coupled to a transceiver 42. The transceiver 42 includes the interrogator 50 and a receiver 62. The interrogator functions as described above with reference to FIG. 3. The receiver 62 include includes a sampling system 91, and a digital system 98. The sampling system 91 includes an analog-to-digital converter 93 and an adjustable sample clock 96 in which the frequency of the output clock signal is tunable by the digital system 98. The adjustable sample clock 96 is communicatively coupled to send an adjustable single frequency clock signal to the analog-to-digital converter 93. The analog-to-digital converter 93 is followed by a down-conversion process implemented as part of the digital signal processing performed in the digital system 98. Such down-conversion is a mathematical process that can be accomplished in a variety of ways known in the art.

The antenna 70 emits the pulse-pair signals 300 (FIG. 1) and receives the pulse-pair radio frequency signals 301 (FIG. 1). The antenna 70 sends the received radio frequency signals via the connection 303 to the analog-to-digital converter 93 in the sampling system 91. The analog-to-digital converter 93 in the sampling system 91 receives the radio frequency signal from the antenna 70 and converts received radio frequency signal to downshifted-sampled-digital signals. The downshifted-sampled-digital signals are output from the sampling system 91 via connection 310 to the digital system 98 for digital processing.

The digital system 98 determines if the unique identifying code associated with the transponder 30 (FIG. 1) is detected. If the unique identifying code is un-detected, the digital system 98 outputs control signals to tune the adjustable sample clock 96. The adjustable sample clock 96 receives control signals from the digital system 98 and responsive to the control signal, shifts the frequency of the signal output from the sample clock by Δf. The signal output from the sample clock that is shifted by Δf adjustable sample clock 96 is referred to as a tuned clock signal. The tuned clock signal is sent to the analog-to-digital converter 93. The analog-to-digital converter 93 re-samples the received-downshifted radio frequency signal with the tuned clock signal. The re-sampled signal is output from the sampling system 91 to the digital system 98 via connection 310.

If the unique identifying code is detected, the adjustable sample clock 96 continues to feed the same frequency to the analog-to-digital converter 93.

Figure 9:
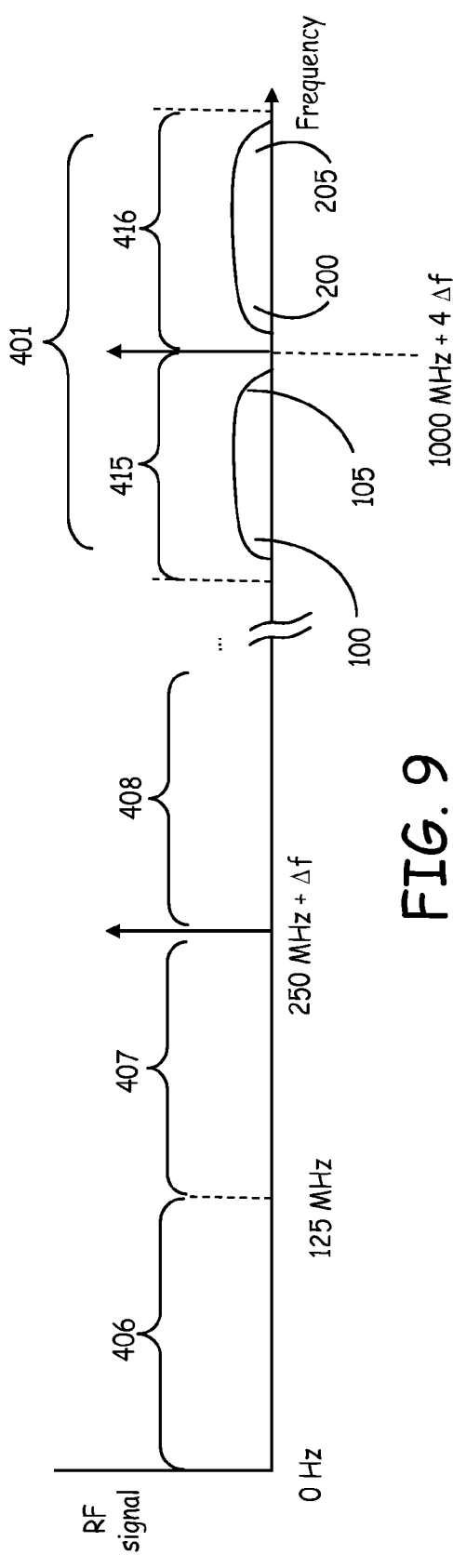
FIG. 9 shows one embodiment of the frequency distribution of distance measurement equipment channels emitted from the ground based transponder.

FIG. 9 shows one embodiment of the frequency distribution of distance measurement equipment channels 401 emitted from the ground based transponder. In this exemplary embodiment, the sample clock has been shifted from 250 MHz to (250+4Δf) MHz. An arrow at (1000+4Δf) MHz or four times the sample clock frequency is positioned between the eighth Nyquist band 415 and the ninth Nyquist band 416.

Figure 10:
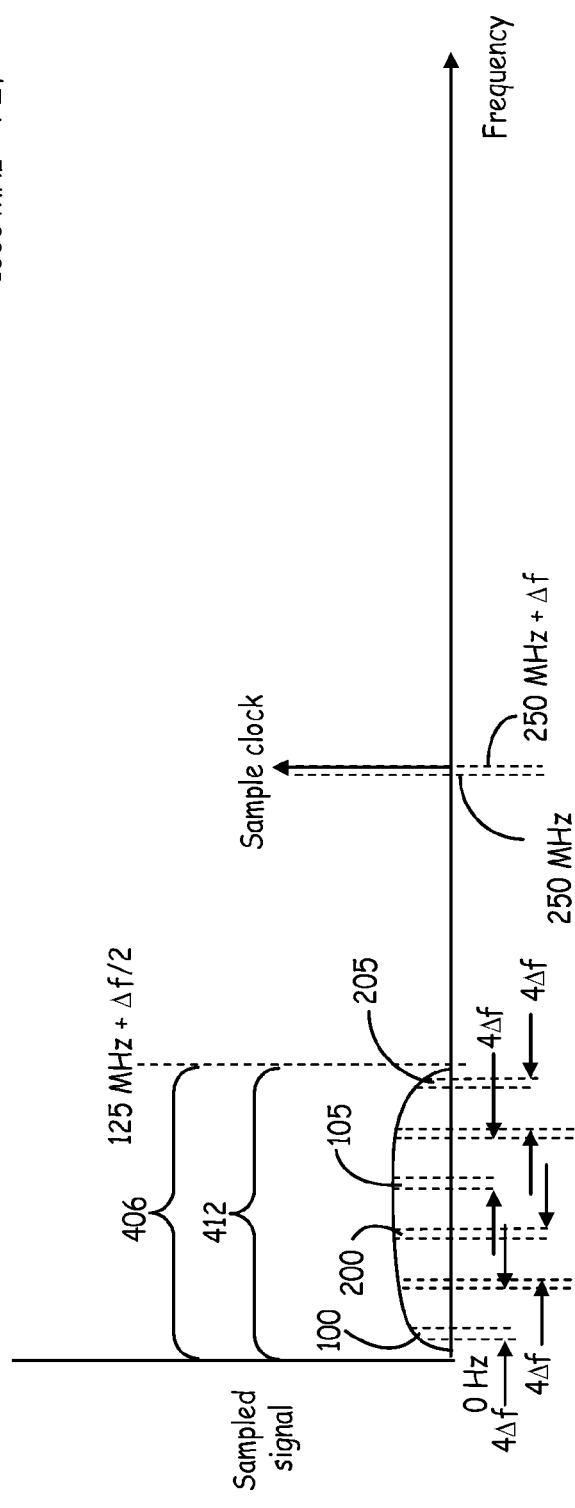
FIG. 10 shows one embodiment of the frequency distribution of downshifted distance measurement equipment channels after being sampled with a tuned sample clock.

FIG. 10 shows one embodiment of the frequency distribution of downshifted DME channels 412 after being sampled with a tuned sample clock 96 at (250+Δf) MHz.

FIG. 10 is similar to FIG. 5, except the signals received at the receiver 62 within channels of the broadband DME channels 401 (FIG. 9) are downshifted and sampled by the sampling system 91 (FIG. 8) after the adjustable sample clock 96 is shifted by Δf. The sampled-downshifted-DME channels 412 are distributed within the frequency range of about the first Nyquist band 406 of the analog-to-digital converter sample clock. In this exemplary embodiment, the sample clock is set at (250+Δf) MHz. And the first Nyquist band 406 extends from 0 Hz to ((250+Δf)/2) MHz. For the purposes of the discussion of an exemplary case, the shift Δf is positive and the adjustable sample clock 96 in FIG. 10 is adjusted to a frequency higher than the original frequency of the adjustable sample clock 96.

Since the adjustable sample clock 96 has been adjusted by Δf, the first channel 100 and the fourth channel 205 are offset from each by 8Δf near the lower frequency range of the first Nyquist band 406. The first channel 100 shifts down in frequency by 4Δf from the location of first channel 100 in FIG. 5. The fourth channel 205 shifts up in frequency by 4Δf from the location of fourth channel 205 in FIG. 5. The second channel 105 and the third channel 200 also offset from each by 8Δf near highest frequency range in the first Nyquist band 406. The second channel 105 shifts down in frequency by 4Δf from the location of second channel 105 in FIG. 5. The third channel 200 shifts up in frequency by 4Δf from the location of third channel 200 in FIG. 5. Similarly, the other channels that are positioned between the first channel 100 and the second channel 105 also offset by 8Δf from respective other channel that are positioned between the third channel 200 and the fourth channel 205.

The first channel 100 and the fourth channel 205 at the low frequency end of the first Nyquist band do not interfere with each other and the second channel 105 and the third channel 200 at the high frequency end of the first Nyquist band 406 do not interfere with each other. Thus, when the adjustable sample clock 96 is tuned by Δf, the receiver 62 is able to detect the unique identifying code the previously overlapping channels.

In this manner, bands of assigned channels, such as DME channels 401 (FIG. 2), are mixed and undersampled to generate sampled-downconverted band, such as sampled-downshifted-DME channels 410 (FIG. 5); the unique identifying code is detected when there are no overlapping active channels; and the unique identifying code is not detected when there are overlapping active channels. When the unique identifying code is not detected the frequency of the assigned channels is shifting the frequency of the clock signal output from the adjustable sample clock 96. The bands of assigned channels are remixed in the analog-to-digital converter 93 to generate downconverted bands, and the downconverted bands are undersampled with the tuned adjustable sample clock 96 to generate tuned-downconverted bands, such as sampled-downshifted-DME channels 412. Then the unique identifying code is detectable.

Figure 11:
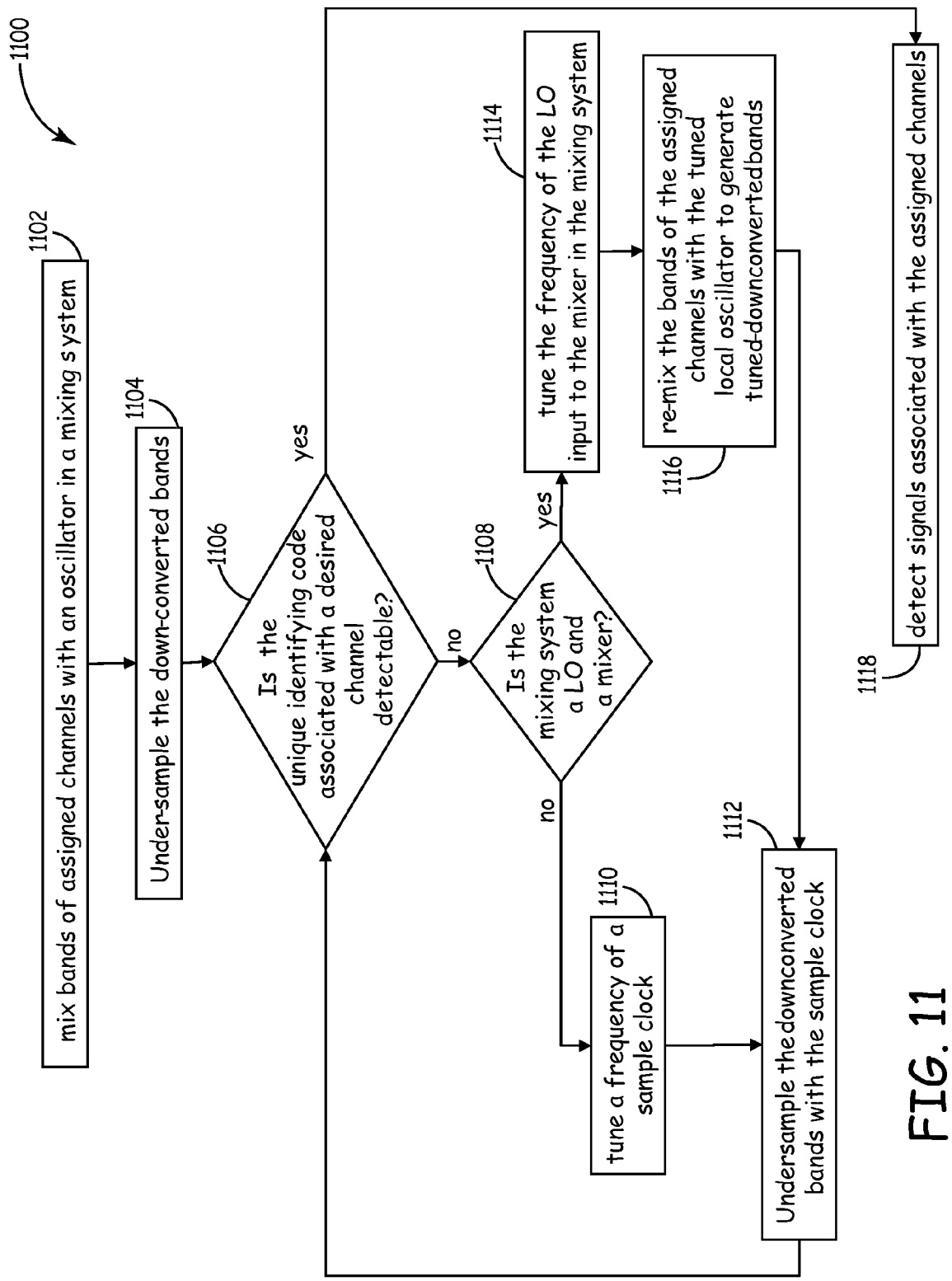
FIG. 11 is a flow diagram of one embodiment of a method to receive channels in an undersampled broadband receiver.

FIG. 11 is a flow diagram of one embodiment of a method 1100 to receive channels in an undersampled broadband receiver. The method 1100 is described with reference to exemplary embodiments of apparatus 12 in FIG. 3 and apparatus 13 in FIG. 8 and with reference to exemplary embodiments of DME channels 401 of FIGS. 2 and 2i.

The bands of assigned channels are mixed with an oscillator in a mixing system to generate downconverted bands and to convert radio frequency channels to intermediate frequency channels based on the mixing (block 1102). If the mixing is done in apparatus 12 of FIG. 3, the mixing system 80 does the mixing. If the mixing is done in apparatus 13 of FIG. 8, the analog-to-digital converter 93 does the mixing.

The downconverted bands are undersampled (block 1104). If the undersampling is done in apparatus 12 of FIG. 3, the sampling system 90 does the undersampling. If the undersampling is done in apparatus 13 of FIG. 8, the sampling system 91 does the undersampling.

When the unique identifying code associated with a desired channel is not detected (block 1106) and the mixing system does not include a tunable local oscillator and a mixer (block 1108), a frequency of the sample clock that is communicatively coupled to an analog-to-digital converter is tuned (block 1110). In one implementation of this embodiment, the digital system 98 determines that the unique identifying code associated with a desired channel is not detected and sends a control signal via connection 306 to the adjustable sample clock 96 so that the frequency output from the adjustable sample clock 96 is up-shifted or down-shifted. In this case, the analog-to-digital converter 93 receives the shifted frequency output from the adjustable sample clock 96.

The downconverted bands are undersampled (block 1112). In one implementation of this embodiment, the analog-to-digital converter 93, in conjunction with the tuned adjustable sample clock 96, undersamples the downconverted bands. Then the digital system 98 determines whether or not the unique identifying code associated with a desired channel is detected (block 1106) in the undersampled downconverted bands.

If the unique identifying code associated with a desired channel is detected (block 1106) after the sample clock is tuned, the signals associated with the assigned channels are detected (block 1118) based on detecting the unique identifying code associated with the desired channel. In one implementation of this embodiment, the digital system 98 detects the signals associated with the assigned channels 401.

When the unique identifying code associated with a desired channel is not detected (block 1106) and the mixing system does includes a tunable local oscillator, such a tunable local oscillator 85, and a mixer, such as mixer 87, (block 1108), a frequency of the local oscillator input to the mixer in the mixer system is tuned (block 1114). In one implementation of this embodiment, the frequency of the tunable local oscillator 85 input to the mixer 87 in the mixer system 80 is tuned responsive to receiving a control signal from the digital system 98.

The bands of the assigned channels are remixed with the tuned local oscillator to generate tuned-downconverted bands (block 1116). In one implementation of this embodiment, the mixer 87 in mixing system 80 remixes the assigned channels 401 with the tuned local oscillator 85 to generate tuned-downconverted bands 405 (FIG. 4). In this case the mixing system 80 outputs downshifted DME channels 405 to the sampling system 90.

The tuned-downconverted bands are undersampled with the sample clock (block 1112). In one implementation of this embodiment, the analog-to-digital converter 92, in conjunction with the fixed sample clock 95, undersamples the downconverted bands. Then the digital system 98 determines whether or not the unique identifying code associated with a desired channel is detected (block 1106) in the undersampled downconverted bands.

If the unique identifying code associated with a desired channel is detected (block 1106) after the tunable local oscillator is tuned, the signals associated with the assigned channels are detected (block 1118) based on detecting the unique identifying code associated with the desired channel. In one implementation of this embodiment, the digital system 98 detects the signals associated with the assigned channels 401.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to receive channels in an undersampled broadband receiver, the method comprising:
    converting received radio frequency signals to downshifted-sampled-digital signals at an analog-to-digital converter in a sampling system, wherein each channel in the radio frequency signal has an assigned unique identifying code;
    outputting the downshifted-sampled-digital signals to a digital system for digital processing;
    determining if the unique identifying code associated with a desired channel is detectable;
    when the unique identifying code is detectable, detecting the unique identifying code associated with the desired channel;
    when the unique identifying code is undetectable, outputting control signals from the digital system to tune an adjustable sample clock in the sampling system; and
    tuning the adjustable sample clock based on the output control signals.

2. The method of claim 1, further comprising detecting the unique identifying code associated with the desired channel based on the tuning.

3. The method of claim 1, wherein tuning the adjustable sample clock comprises:
    receiving the control signals from the digital system;
    responsive to receiving the control signal, shifting the frequency of the signal output from the sample clock by a frequency offset to form a tuned clock signal; and
    sending the tuned clock signal to the analog-to-digital converter.

4. The method of claim 3, further comprising:
    re-sampling the received-downshifted radio frequency signal with the tuned clock signal; and
    outputting the re-sampled signal from the sampling system to the digital system.

5. The method of claim 1, further comprising continuing to feed the same frequency of the signal output from the sample clock to the analog-to-digital converter when the unique identifying code is detectable.

6. The method of claim 1, further comprising detecting signals associated with assigned channels based on detecting the unique identifying code associated with the desired channel.

7. The method of claim 6, wherein the assigned channels are distance measurement equipment channels and wherein detecting the unique identifying code associated with the desired channel comprises detecting either an X channel pulse spacing or a Y channel pulse spacing.

8. The method of claim 6, wherein the assigned channels are distance measurement equipment channels and wherein detecting the unique identifying code associated with the desired channel comprises detecting an assigned Morse code.

9. An apparatus to remove aliasing effects of undersampled radio frequency signals in an analog-to-digital conversion, the system comprising:
    a transceiver communicatively coupled to a transponder, the transceiver operable to receive radio frequency signals having a unique identifying code associated with the transponder, wherein the transceiver comprises:
        a sampling system to convert received radio frequency signals to digital signals; and
        a digital system to determine if the unique identifying code associated with the transponder is detected and to tune a tunable local oscillator if the unique identifying code is undetected, wherein the sampling system comprises:
    an analog-to-digital converter to receive the radio frequency signal; and
    an adjustable sample clock, wherein the adjustable sample clock is the tunable local oscillator, the adjustable sample clock configured to receive control signals from the digital system, the control signals operable to adjust the sample clock, wherein the adjustable sample clock inputs a tunable clock signal to the analog-to-digital converter, wherein a sampled signal is output from the sampling system.

10. The apparatus of claim 9, further comprising:
    an antenna to output the received radio frequency signals to the analog-to-digital converter.

11. The apparatus of claim 9 wherein the transponder is in distance measurement equipment and wherein the transponder transmits the radio frequency signals having the unique identifying code associated with the transponder.

12. The apparatus of claim 11, wherein the assigned channels are distance measurement equipment channels and the unique identifying code is one of an assigned Morse code, detecting an X channel pulse spacing, or detecting a Y channel pulse spacing.

13. The apparatus of claim 9 wherein the transponder is included within one of an air traffic control radar beacon system (ACTRBS) and a universal access transceiver, automatic dependent surveillance-broadcasting (UAT ADS-B) system, and wherein the format of the signals supported by the system incorporates the unique identifying code.

14. A system to detect a unique identifying code in an undersampled broadband receiver, the system comprising:
    means for converting received radio frequency signals to downshifted-sampled-digital signals;
    means for outputting the downshifted-sampled-digital signals;
    means for determining if a unique identifying code associated with a desired channel is detectable;
    means for detecting the unique identifying code associated with the desired channel when the unique identifying code is detectable;
    means for outputting control signals when the unique identifying code is undetectable; and
    means for shifting the frequency of the signal output from an adjustable sample clock by a frequency offset.

* * * * *